United States Patent [19]

Kakita et al.

[11] Patent Number: 4,534,885

[45] Date of Patent: Aug. 13, 1985

[54] PHOSPHATE FLUORESCENT SUBSTANCE

[75] Inventors: Shusaku Kakita; Thihiro Yoshida, both of Odawara, Japan

[73] Assignee: Kasei Optonix, Ltd., Tokyo, Japan

[21] Appl. No.: 625,298

[22] Filed: Jun. 27, 1984

[30] Foreign Application Priority Data

Jun. 30, 1983 [JP] Japan ............................... 58-118996

[51] Int. Cl.³ ............................................. C09K 11/08
[52] U.S. Cl. ......................... 252/301.4 P; 252/301.36; 313/467; 423/311; 427/157
[58] Field of Search ................... 252/301.4 P; 423/311

[56] References Cited

U.S. PATENT DOCUMENTS 3,013,979 12/1961 Ranby et al. ................. 252/301.4 P
4,207,301 6/1980 Danjushevskaya ................. 423/311

OTHER PUBLICATIONS

Farnsworth, et al., Zinc Chemicals; Zinc Institute Inc., New York, N.Y., 1974.

Primary Examiner—Arthur P. Demers
Attorney, Agent, or Firm—Oblon, Fisher, Spivak, McClelland & Maier

[57] ABSTRACT

In a phosphate fluorescent substance including orthophosphate as a parent material and manganese as a main activator, said phosphate fluorescent substance has at least one of the following features (I) and (II): (I) The maximum intensity point in the glow curve is within the range of 200°–400° C. and (II) Ia/Ib is within the range of 0.6–3.0.

11 Claims, 6 Drawing Figures

PHOSPHATE FLUORESCENT SUBSTANCE

BACKGROUND OF THE INVENTION

1. Field of the Invention:

This invention relates to a phosphate fluorescent substance. More particularly, this invention relates to a phosphate fluorescent substance having high brightness and high brightness maintenance ratio and specific properties.

2. Description of the Prior Art:

A phosphate fluorescent substance whose parent material is orthophosphate of divalent metal including zinc and whose main activator is manganese (referred to as phosphate fluorescent substance hereinafter) emits red light of high brightness under electron beam excitation and is commonly used for cathode-ray tubes (CRTs). As this phosphate fluorescent substance has the property of prolonged 10% afterglow time (the time required for the brightness to degrade to a value of 10% after excitation ceases), it is widely used for CRTs, especially for CRTs for displays which adopt a scanning speed slower than the CRTs of color TVs, such as computer terminal display devices and the indicating devices of a flight control system.

This kind of phosphate fluorescent substance is basically composed of a phosphate fluorescent substance which is represented as $Zn_3(PO_4)_2$: Mn, and part of the main material is replaced or other co-activators or additives are contained in its composition, as is shown in the prior art, such as Japanese Patent Publication No. 18471/1978, or Japanese Patent Public Disclosure Nos. 121258/1981, 136873/1981, 87487/1982 and 40380/1983 by the applicant of this invention.

However, these phosphate fluorescent substance compositions suffer from pronounced degeneration of the brightness compared with other general phosphate fluorescent substance compositions under electron beam excitation over long periods and, additionally, their initial brightness is not sufficient. For these reasons, when they were used in CRTs for displays and the like, color drift is disadvantageously caused by degeneration of the brightness or the current balance is disturbed, because the service current of such CRTs has to be increased above that of electron guns for exciting other luminescent color fluorescent substances because of the insufficient initial brightness.

Further, a phosphate fluorescent substance has excellent solubility in water and is liable to become hydrate by hydrolysis, and therefore it has been observed that a phosphate fluorescent substance may stop emitting from its surface part in the correct sequential order.

In order to avoid this phenomenon various devices have been adopted in producing a fluorescent substance so as not to prolong the wet state during the treatment step after firing and during the step of producing fluorescent films for cathode-ray tubes, but these have required special treatment means which are disadvantageous not only technically but also economically.

SUMMARY OF THE INVENTION

It is an object of this invention to provide a phosphate fluorescent substance which has an increased initial brightness and a high brightness maintenance ratio and which is not susceptible to hydrolysis.

As a result of their research on phosphate fluorescent substances undertaken to accomplish the above object, the inventors have found that the desired phosphate fluorescent substance is obtainable by reacting mainly orthophosphoric acid with at least one compound selected from the group consisting of zinc carbonate, zinc oxide and zinc hydroxide and using its reaction product as a material for a phosphate substance.

DESCRIPTION OF THE INVENTION INCLUDING THE PREFERRED EMBODIMENTS

Figure 1A:
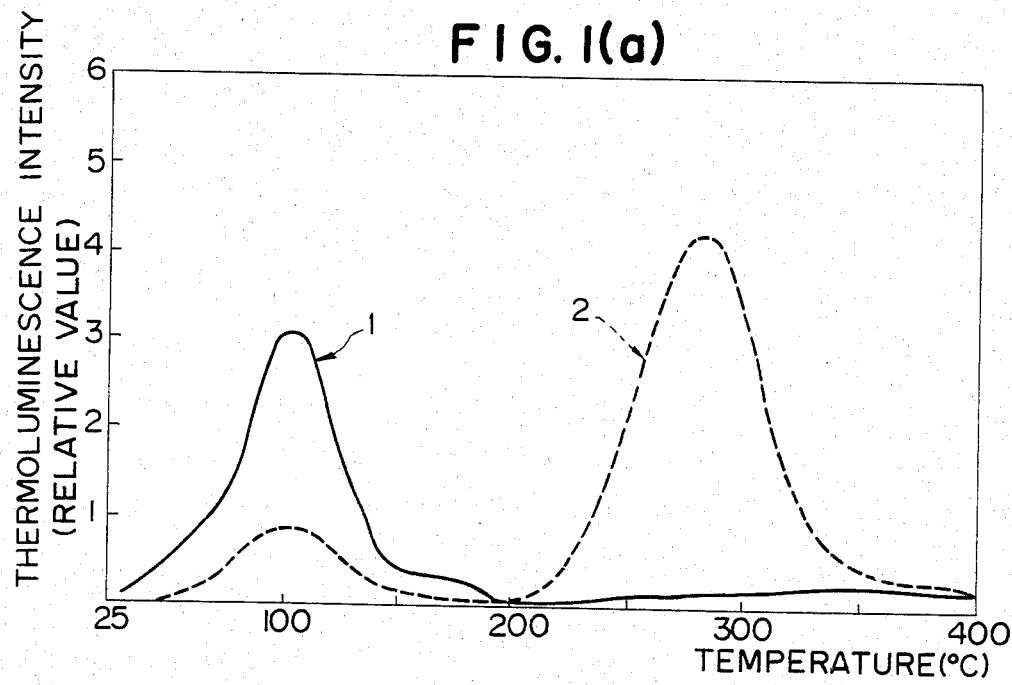
FIGS. 1($a$) and 1($b$) are a glow curve, wherein curve 1 is a conventional phosphate fluorescent substance and curve 2 the phosphate fluorescent substance according to the invention.

A phosphate fluorescent substance according to the invention has the following features:

(I) The maximum intensity point in the glow curve in the range of 25° C.–400° C. of said phosphate fluorescent substance is within the range of 200° C.–400° C.; and/or (II) Ia/Ib is within the range of 0.6–3.0, wherein Ia and Ib denote the maximum intensity of emission of said phosphate fluorescent substance when said phosphate fluorescent substance is excited by exciting energy whose excitation wavelength is 200–280 nm and 380–420 nm, respectively.

An example of a process of producing the phosphate fluorescent substance according to the invention will be described in the following.

The aggregates of primary particles consisting of finely divided particles (secondary particles) are first co-precipitated by the above-mentioned zinc compound and, if necessary, at least one selected from the group consisting of divalent metal carbonates, oxides and hydroxide, said divalent metal being at least one selected from the group consisting of magnesium, calcium, strontium, barium and beryllium, and orthophosphoric acid. Then, a parent material, i.e. the co-precipitated material of orthophosphate of zinc and optionally the other divalent metal which was obtained in the above way, is activated by using a manganese compound as an activator material. The particle diameter of the above primary particles may be adjusted by controlling stirring speed, liquid temperature and pH etc.

Heretofore, phosphate fluorescent substances have been produced by firing the material prepared by mixing in the dry process or in paste state with solvent zinc compounds, phosphate salts such as diammonium hydrogen phosphate, manganese compounds and flux etc. Or a process has been proposed wherein a parent material, an activator and a co-activator are co-precipitated as orthophosphate, instead of obtaining mixture material for phosphate fluorescent substance by mixing each material mechanically.

The conventional co-precipitation process involves making the co-precipitated material by reacting zinc compounds such as zinc sulfate and zinc nitrate, and the solution of phosphate compounds of acid salt etc. such as ammonium hydrogen phosphate and sodium phosphate but the phosphate fluorescent substance produced using material co-precipitated in this way did not satisfy the object and the effects of this invention at all.

Briefly, this invention is characterized by using "orthophosphoric acid".

Also, it is noted that other kinds of phosphoric acid, such as "meta-", "para-" and "poly-", and their salts have been proved to be incapable of accomplishing the object of the invention.

The process of producing the phosphate fluorescent substance according to the invention will be described in more detail hereinunder.

At least one compound selected from the group consisting of zinc carbonate, zinc oxide and zinc hydroxide and, if necessary, at least one compound selected from the group consisting of divalent metal carbonate, oxide and hydroxide, said metal being at least one selected from the group consisting of magnesium, calcium, strontium, barium and beryllium are first dispersed into purified water. The liquid is next mixed quickly into orthophosphoric acid solution under stirring at high speed, thereby to obtain the aggregates of primary particles consisting of finely divided particles (secondary particles) of orthophosphate of zinc or divalent metals containing zinc.

As another process, the aggregates of primary particles consisting of finely divided particles (secondary particles) of manganese orthophosphate are obtained by mixing quickly during stirring at high speed the liquid made by dispersing at least one selected from the group consisting of carbonate, oxide and hydroxide of zinc or the above divalent metal containing zinc in purified water, into orthophosphoric acid solution in which is dissolved at least one manganese compound such as manganese carbonate.

By dehydrating and drying the co-precipitated material obtained in this way, the parent material or the parent material and the material for an activator are prepared.

At least one of maganese compounds such as chloride, carbonate and sulfate etc. is sufficient as an activator to be added to the co-precipitated parent material. If necessary, an appropriate amount of co-activators (e.g. lead, arsenic), additives and fluxes which are disclosed in the specification of the Japanese Patent Public Disclosures as above mentioned may be mixed therewith. Particularly, oxides, carbonates and hydroxides of an element which is a component of the intended phosphate fluorescent substance and is not mentioned above may be added to the solution to be co-precipitated.

When the materials for the phosphate fluorescent substance are co-precipitated or mixed, each of the materials should be co-precipitated or weighed out so as to match the chemical composition of the intended phosphate fluorescent substance stoichiometrically.

Mixing is conducted by an ordinary process; it may be conducted by the dry process using a ball-mill, a mixer-mill, a mortar or the like, or it may be conducted by the wet process forming the materials in paste state with water, alcohol, weak acid or the like as a medium.

In addition, fluxes are often added to the mixture material for phosphate fluorescent substance to heighten the brightness, particulate properties or the like. In this invention, too, an appropriate amount of ammonium salt, such as ammonium chloride ($NH_4Cl$) or ammonium carbonate ($(NH_4)_2CO_3$) can be added to the mixture material for phosphate fluorescent substance to achieve the above purpose.

The mixture material for phosphate fluorescent substance is charged into a heat-resistant container such as an alumina crucible or quartz crucible for firing.

One or more cycles of firing are conducted at a temperature of 800°–1,100° C. in an oxidizing atmosphere, i.e. in the air, in a neutral atmosphere such as an atmosphere of nitrogen gas or an atmosphere of argon gas, or in a reducing atmosphere such as an atmosphere of nitrogen gas containing a small amount of hydrogen gas, an atmosphere of carbon monoxide or an atmosphere of carbon dioxide.

The firing time is different depending on the amount of phosphate fluorescent substance which is charged into the heat-resistant container, the firing temperature adopted and the like, but generally, 0.5–5 hours are appropriate in the range of the firing temperature above mentioned.

The obtained fired material is made into phosphate fluorescent substance particles according to this invention after the method usually adopted in producing phosphate fluorescent substance such as pulverization, cleaning, drying and sieve analysis.

Comparison between a specimen of the phosphate fluorescent substance according to the invention obtained in this way and a conventional phosphate fluorescent substance leads to the following results which show that they are completely different.

The initial brightness of the phosphate fluorescent substance of the invention is 5–10% or more higher than that of the conventional one.

FIG. 1 is a glow curve showing the relation between temperature and thermoluminescence intensity. A phosphate fluorescent substance whose composition is represented as $Zn_3(PO_4)_2$: Mn was irradiated with ultraviolet rays of 253.7 nm for one minute and immediately thereafter the temperature was raised from a normal temperature (25° C.) to 400° C. at the speed of 6.5° C./sec, and the thermoluminescence was measured with a photomultiplier. Curve 1 in FIG. 1 is a conventional phosphate fluorescent substance which was obtained according to the conventional method above mentioned and curve 2 is the phosphate fluorescent substance according to the invention.

As is obvious from FIG. 1, the conventional phosphate fluorescent substance has a maximum intensity point in the range of 25°–150° C., while the phosphate fluorescent substance according to the invention has a maximum intesity point in the range of 200°–400° C.

In this way, the phosphate fluorescent substance of the invention is very different from the conventional one in various properties. Generally speaking, the phosphate fluorescent substance according to the invention has somewhat different glow curves depending on the manufacturing process used. From many experiments, it was noted that the glow curve has a ratio in height of 2:3 to 1:10 between the peak in the range of 25°–150° C. and the peak in the range of 200° C.–400° C.

FIG. 2 shows the luminescence intensity when a phosphate fluorescent substance represented as $Zn_3(PO_4)_2$: Mn was irradiated with ultraviolet rays of 200 nm–500 nm. Curve 1 is the conventional phosphate fluorescent substance and curve 2 is the phosphate fluorescent substance according to this invention. In this figure also, the luminescence properties of the two phosphate fluorescent substances are completely different. For example, the conventional phosphate fluorescent substance is represented by the following formula: $Ia/Ib \approx 3.7$, while the phosphate fluorescent substance according to the invention is represented as follows: $Ia/Ib \approx 1.8$, wherein Ia and Ib denote the maximum intensity of emission when the phosphate fluorescent substance is excited by exciting energy whose excitation wavelength is 200-280 nm and 380-420 nm, respectively.

This means that this phosphate fluorescent substance emits less than the conventional one in ultraviolet rays (especially short wave ultraviolet rays), and further, the ratio of Ia/Ib is remarkably low compared with that of the conventional one. One feature of this invention is that the inventor found that the ratio of Ia/Ib has a close relationship with the deterioration property of the brightness of the phosphate fluorescent substance.

This will be explained with reference to FIG. 3. The fluorescent film of a specimen of phosphate fluorescent substance was irradiated with a cathode-ray of 20 KV of accelerating voltage and $10 \mu A/cm^2$ of current density for 15 minutes (forced deterioration test). The percentage of the brightness after irradiation based on the initial brightness was calculated as the brightness maintenance ratio, and the relationship between the brightness maintenance and Ia/Ib as mentioned above was examined. The results are shown in FIG. 3, wherein mark "X" denotes the conventional phosphate fluorescent substance and mark "O" the phosphate fluorescent substance according to the invention.

Figure 3:
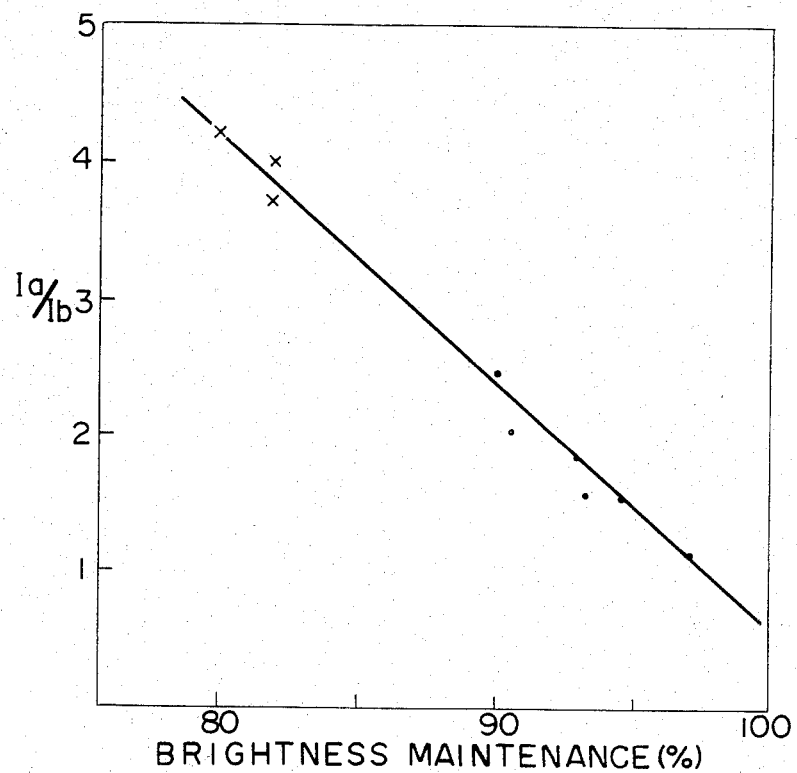
FIG. 3 shows the relation between brightness maintenance ratio (%) and Ia/Ib.

As is obvious from FIG. 3, in the conventional phosphate fluorescent substance, the ratio of Ia/Ib is not less than 3.5 and the brightness maintenance ratio is not more than 83%. On the other hand, the ratio of Ia/Ib of the phosphate fluorescent substance according to the invention is not more than 2.5, and yet, its brightness maintenance ratio is not less than 90%.

As a result of more experiments, it was confirmed that a condition in which Ia/Ib is not more than 3.0 is indispensable in order to obtain a brightness maintenance ratio of 87% and more (this value shows that the phoshate fluorescent substance under ordinary use condition suffers no burning which, if it should occur, would be diadvantageous in practical use).

It was confirmed also, however, that when Ia/Ib is 0.6 or less, unfavorable drawbacks in other properties (e.g. the initial brightness) arise.

Thus, from the viewpoint of the brightness maintenance ratio, Ia/Ib is not more than 3.0, preferably not more than 2.5, and from the viewpoint of the initial brightness, it is not less than 0.6, preferably not less than 1.0.

Therefore, the condition imposed in this invention, namely $Ia/Ib = 0.6-3.0$, especially $Ia/Ib = 1.0-2.5$ is preferable.

In addition, in this invention it is necessary to have at least one feature selected from (I) and (II) above.

As the conventional phosphate fluorescent substance has excellent solubility in water, it was liable to be hydrolized in aqueous solution such as polyvinyl alcohol solution used for coating phosphate fluorescent substance, which undesirably invites deterioration of brightness and change of viscosity. Thus, the produced cathode-ray tubes lacked quality stability.

Figure 4:
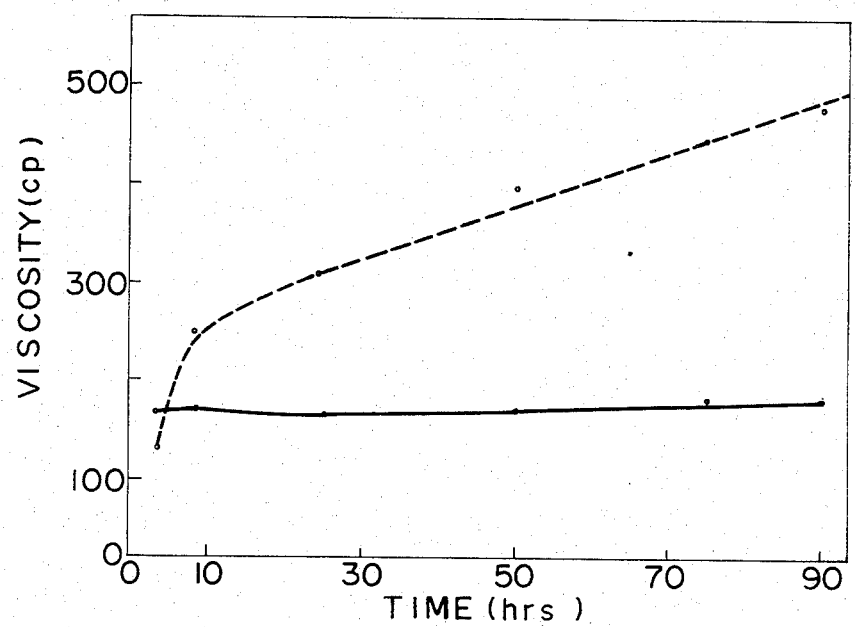
FIG. 4 shows the change of a slurry of a phosphate fluorescent substance in an aqueous solution of polyvinyl alcohol with time, as a relation between time and viscosity.

FIG. 4 shows the change of slurry of phosphate fluorescent substance in polyvinyl alcohol solution with time (during stirring) as a relation between time and change in viscosity. Curve 1 is the conventional phosphate fluorescent substance and curve 2 is the phosphate fluorescent substance according to this invention.

As is obvious from this figure, the viscosity of the slurry of phosphate fluorescent substance is largely changed by hydrolysis, which makes necessary a special coating process other than the orginary one, but, in this invention, the slurry viscosity scarcely chnges, as shown in curve 2 which enables the use of the ordinary coating process.

As described above, the phosphate fluorescent substance according to this invention has special features distinguishable from the conventional one. Further it manifests marked effects in industrial use, because the initial brightness is more than 5-10% higher, and the brightness maintenance ratio is increased by 10-17% or more, and it is stable against water.

The following are examples of this invention. These are presented for explanatory purposes and are not to be considered as limiting the invention in any way.

EXAMPLE 1

| Zinc carbonate | $ZnCO_3$ | 332.4 g |
| --- | --- | --- |
| Phosphoric acid | $H_3PO_4$ | 230.6 g |
| Manganese carbonate | $MnCO_3$ | 5.8 g |

Each material of the above compound ratio was first co-precipitated in purified water. The zinc manganese orthophosphate hydrate obtained was charged into a quartz crucible, put into an electric furnace, and fired in air at a temperature of 900° C. for 1.5 hours, to obtain a phosphate fluorescent substance which is shown as $Zn_3(PO_4)_2 : 0.05$ Mn by chemical formula. This phosphate fluorescent substance displayed a glow curve having a maximum peak at 280° C., similar to curve 2 shown in Fig. 1(a), and it also displayed an excitation spectrum very similar to curve 2 shown in FIG. 2(a), the ratio of the excitation spectrum (Ia/Ib) being 1.47.

The phosphate fluorescent substance obtained was next coated on a glass panel with a coating liquid comprising polyvinyl alcohol and ammonium bichromate. The brightness of the cathode-ray tube produced was 111% and the brightness maintenance ratio was 92.5%.

EXAMPLE 2

| Zinc oxide | $ZnO$ | 244.1 g |
| --- | --- | --- |
| Phosphoric acid | $H_3PO_4$ | 230.6 g |
| Manganese carbonate | $MnCO_3$ | 5.8 g |

Each material of the above compounding ratio was first co-precipitated in purified water. The zinc manganese orthophosphate hydrate obtained was charged into a quartz crucible, put into an electric furnace, and fired in air at a temperature of 900° C. for 1.5 hours, to obtain a phosphate fluorescent substance which is shown as $Zn_3(PO_4)_2 : 0.05$ Mn by chemical formula. This phosphate fluorescent substance displayed a glow curve having a maximum peak at 280° C., similar to curve 2 shown in FIG. 1(a), and it also displayed an excitation spectrum very similar to curve 2 shown in FIG. 2(a), the ratio of the excitation spectrum (Ia/Ib) being 1.72.

The phosphate fluorescent substance obtained was next coated on a glass panel with a coating liquid comprising polyvinyl alcohol and ammonium bichromate.

The brightness of the cathode-ray tube produced was 108% and the brightness maintenance ratio was 91.4%.

EXAMPLE 3

| Zinc hydroxide | $Zn(OH)_2$ | 298.1 g |
| --- | --- | --- |
| Phosphoric acid | $H_3PO_4$ | 230.6 g |
| Manganese carbonate | $MnCO_3$ | 5.8 g |

Each material of the above compound ratio was first co-precipitated in purified water. The zinc manganese orthophosphate hydrate obtained was charged into a quartz crucible, put into an electric furnace, and fired in the air at a temperature of 900° C. for 1.5 hours, to obtain a phosphate fluorescent substance which is shown as $Zn_3(PO_4)_2 : 0.05$ Mn by chemical formula. This phosphate fluorescent substance displayed a glow curve having a maximum peak at 280° C., similar to curve 2 shown in Fig. 1(a), and it also displayed an excitation spectrum very similar to curve 2 shown in FIG. 2(a), and the ratio of an excitation spectrum (Ia/Ib) was 1.81.

The phosphate fluorescent substance obtained was next coated on a glass panel with a coating liquid comprising polyvinyl alcohol and ammonium bichromate. The brightness of the cathode-ray tube produced was 109%, the brightness maintenance ratio being 93.2%.

EXAMPLE 4

| Zinc carbonate | $ZnCO_3$ | 332.4 g |
| --- | --- | --- |
| Calcium hydroxide | $Ca(OH)_2$ | 0.8 g |
| Phosphoric acid | $H_3PO_4$ | 230.6 g |

Each material of the above compound ratio was first co-precipitated in purified water. The zinc orthophosphate hydrate obtained was sufficiently mixed with 5.8 g of manganese carbonate $MnCO_3$ with a ball mill, charged into a quartz crucible, put into an electric furnace, and fired in the air at a temperature of 900° C. for 2.0 hours, to obtain a phosphate fluorescent substance which is shown as $(Zn,Ca)_3(PO_4)_2 : 0.05$ Mn by chemical formula.

Figure 1B:
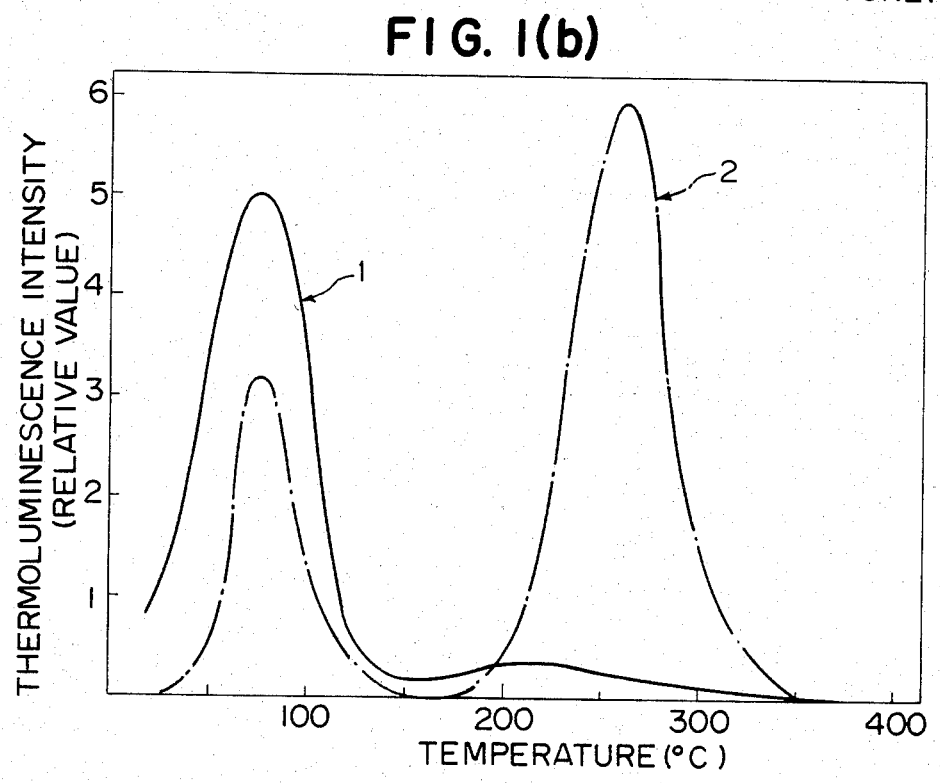
Figure 2A:
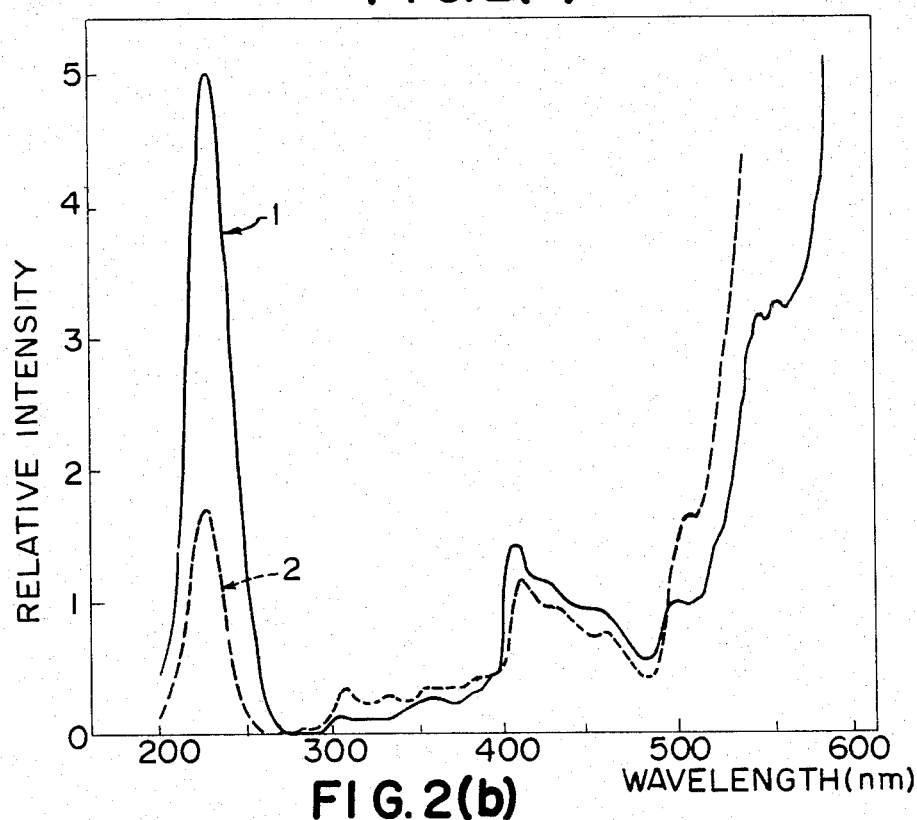
FIGS. 2($a$) and 2($b$) show the luminescence intensity when the phosphate fluorescent substance was irradiated with ultraviolet rays of 200 nm–550 nm. Curve 1 is the conventional phosphate fluorescent substance and curve 2 is the phosphate fluorescent substance of this invention.
Figure 2B:
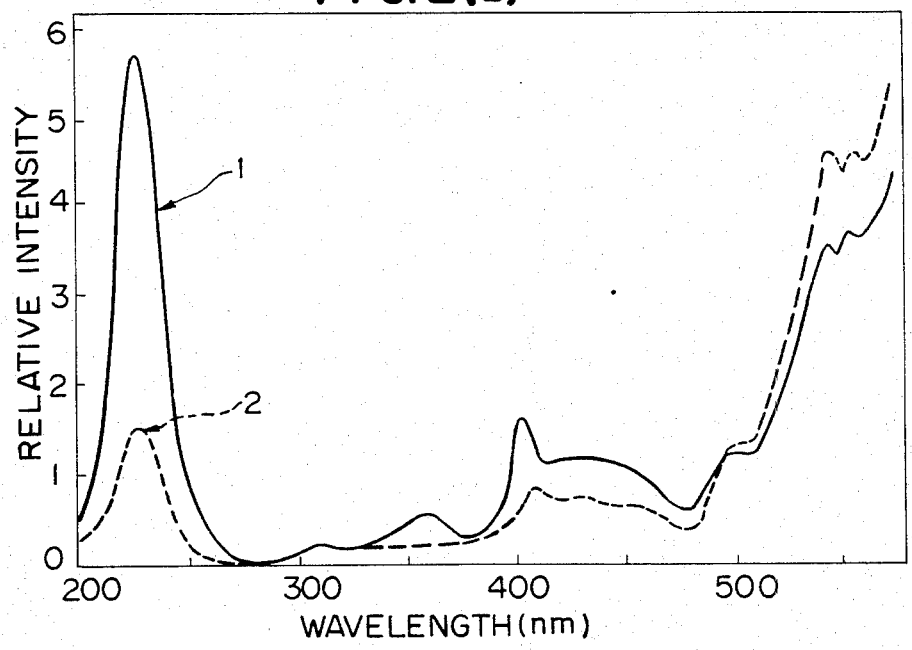

This phosphate fluorescent substance displayed a glow curve having a maximum peak at 280° C., very similar to curve 2 shown in FIG. 1(a), and it also displayed excitation spectrum very similar to curve 2 shown in Fig. 2(a), the ratio of the excitation spectrum (Ia/Ib) being 1.66.

The phosphate fluorescent substance obtained was next coated on a glass panel with a coating liquid comprising polyvinyl alcohol and ammonium bichromate. The brightness of the cathode-ray tube produced was 107% and the brightness maintenance ratio was 94.1%.

EXAMPLE 5

| Zinc carbonate | $ZnCO_3$ | 376.1 g |
| --- | --- | --- |
| Phosphoric acid | $H_3PO_4$ | 230.6 g |
| Manganese carbonate | $MnCO_3$ | 5.8 g |

Each material of the above compound ratio was first co-precipitated in purified water. The zinc manganese orthophosphate hydrate obtained was charged into a quartz crucible, put into an electric furnace, and fired in the air at a temperature of 900° C. for 1.5 hours, to obtain a phosphate fluorescent substance which is shown as $Zn_3(PO_4)_2 : 0.05$ Mn by chemical formula. This phosphate fluorescent substance displayed a glow curve having a maximum peak at 260° C., similar to curve 2 shown in Fig. 1(b), and it also displayed an excitation spectrum very similar to curve 2 shown in FIG. 2(b), and the ratio of an excitation spectrum (Ia/Ib) was 1.92.

The phosphate fluorescent substance obtained was next coated on a glass panel with a coating liquid comprising polyvinyl alcohol and ammonium bichromate. The brightness of the cathode-ray tube produced was 110%, the brightness maintenance ratio being 92.9%.

EXAMPLE 6

| Zinc carbonate | $ZnCO_3$ | 376.1 g |
| --- | --- | --- |
| Phosphoric acid | $H_3PO_4$ | 230.6 g |

Each material of the above compound ratio was first co-precipitated in purified water. The zinc orthophosphate hydrate obtained was sufficiently mixed with 7.6 g of manganese sulfate $MnSO_4$ with a ball mill, charged into a quartz crucible, put into an electric furnace, and fired in the air at a temperature of 900° C. for 2.0 hours, to obtain a phosphate fluorescent substance which is shown as $Zn_3(PO_4)_2 : 0.05$ Mn by chemical formula. This phosphate fluorescent substance displayed a glow curve having a maximum peak at 260° C., similar to curve 2 shown in FIG. 1(b), and it also displayed an excitation spectrum very similar to curve 2 shown in FIG. 2(b), and the ratio of an excitation spectrum (Ia/Ib) was 1.82.

The phosphate fluorescent substance obtained was next coated on a glass panel with a coating liquid comprising polyvinyl alcohol and ammonium bichromate. The brightness of the cathode-ray tube produced was 107%, the brightness maintenance ratio being 92.8%.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A phosphate fluorescent substance having high brightness and a high brightness maintenance ratio which comprises:

(a) a parent material of an orthophosphate of zinc or a mixture of an orthophosphate of zinc and one or more orthophosphates of a divalent metal selected from the group consisting of magnesium, calcium, strontium, barium and beryllium; and (b) a main activator comprising manganese; wherein said phosphate fluorescent substance has a maximum intensity point in the glow curve for the range of 25° C.–400° C. in the range of 200° C.–400° C., or the ratio of Ia/Ib is within the range of 0.6–3.0, wherein Ia and Ib denote the maximum intensity of emission of the phosphate fluorescent substance when said substance is excited by an excitation energy having wavelengths of 200–280 nm and 380–420 nm, respectively; or said substance has a combination of the above.

2. The phosphate fluorescent substance of claim 1, wherein said ratio of Ia/Ib is within the range of 1.0–2.5, thereby having a brightness maintenance ratio of not less than 90%.

3. The phosphate fluorescent substance of claim 1, wherein said orthophosphate of zinc is prepared by reacting orthophosphoric acid with at least one compound selected from the group consisting of zinc carbonate, zinc oxide or zinc hydroxide.

4. The phosphate fluorescent substance of claim 1, wherein said one or more divalent metal orthophosphates are prepared by reacting orthophosphoric acid with one or more divalent metal carbonates, oxides and hydroxides selected from the group of divalent metals consisting of magnesium, calcium, strontium, barium and beryllium.

5. The phosphate fluorescent substance of claim 1, wherein said manganese activator is added to said parent material as manganese chloride, manganese carbonate or manganese sulfate.

6. The phosphate fluorescent substance of claim 1, which further comprises ammonium chloride or ammonium carbonate or a mixture thereof as a flux to enhance brightness.

7. The phosphate fluorescent substance of claim 1, wherein the parent material and manganese activator are mixed in amounts so as to match the stoichiometry of the intended product phosphate fluorescent substance.

8. The phosphate fluorescent substance of claim 1, having the formula $Zn_3(PO_4)_2:0.05\ Mn$.

9. The phosphate fluorescent substance of claim 1, having the formula $(Zn, Ca)_3(PO_4)_2:0.05\ Mn$.

10. The phosphate fluorescent substance of claim 1, produced by:
    (a) dispersing into water at least one compound selected from the group consisting of zinc carbonate, zinc oxide or zinc hydroxide; or a mixture of at least one compound selected from the group consisting of zinc carbonate, zinc oxide or zinc hydroxide with at least one compound selected from the group consisting of a divalent metal carbonate, oxide and hydroxide, said metal being at least one metal selected from the group consisting of magnesium, calcium, strontium, barium and beryllium; a manganese compound selected from the group of manganese carbonate, manganese chloride and manganese sulfate; an orthophosphoric acid, and co-precipitating the hydrated phosphate fluorescent substance; and
    (b) subjecting the hydrated phosphate fluorescent substance to one or more firing cycles.

11. The phosphate fluorescent substance of claim 10, wherein said one or more firing cycles are conducted at a temperature of 800° C.–1,100° C. for about 0.5 to 5 hours.

* * * * *